Aug. 29, 1933.  E. F. KASTEN  1,924,500
CHEESE MOLD
Filed Jan. 20, 1932
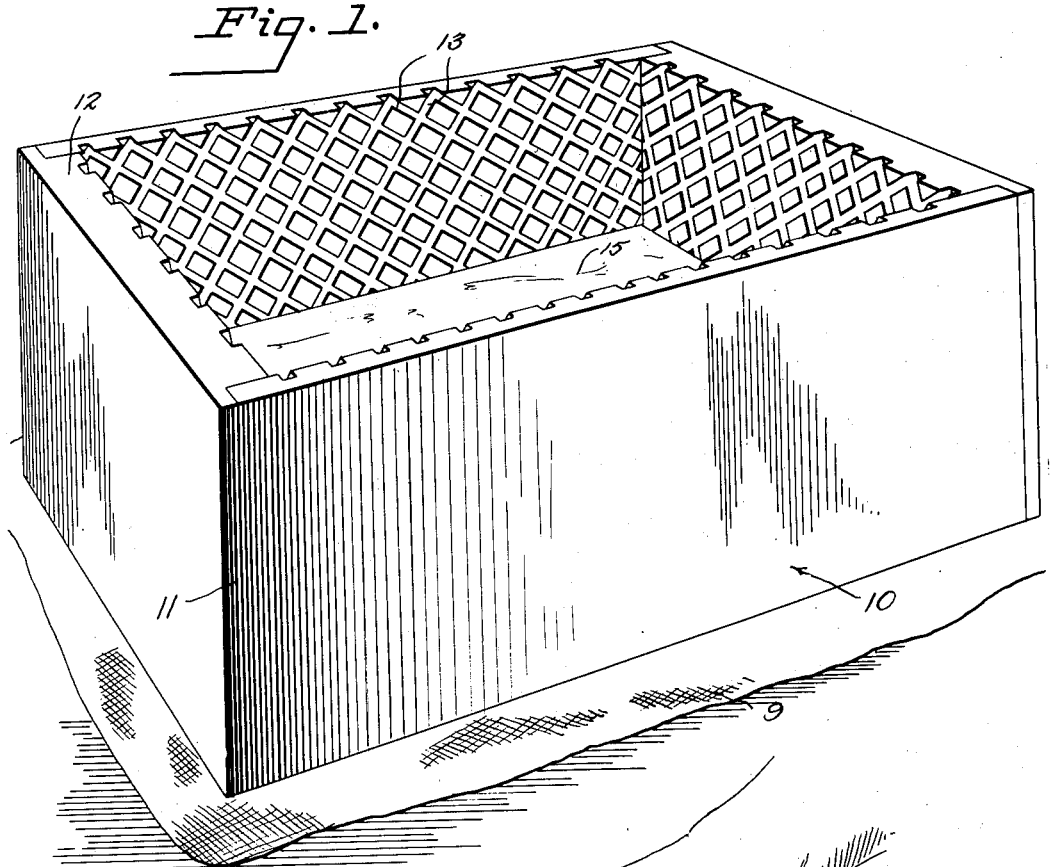
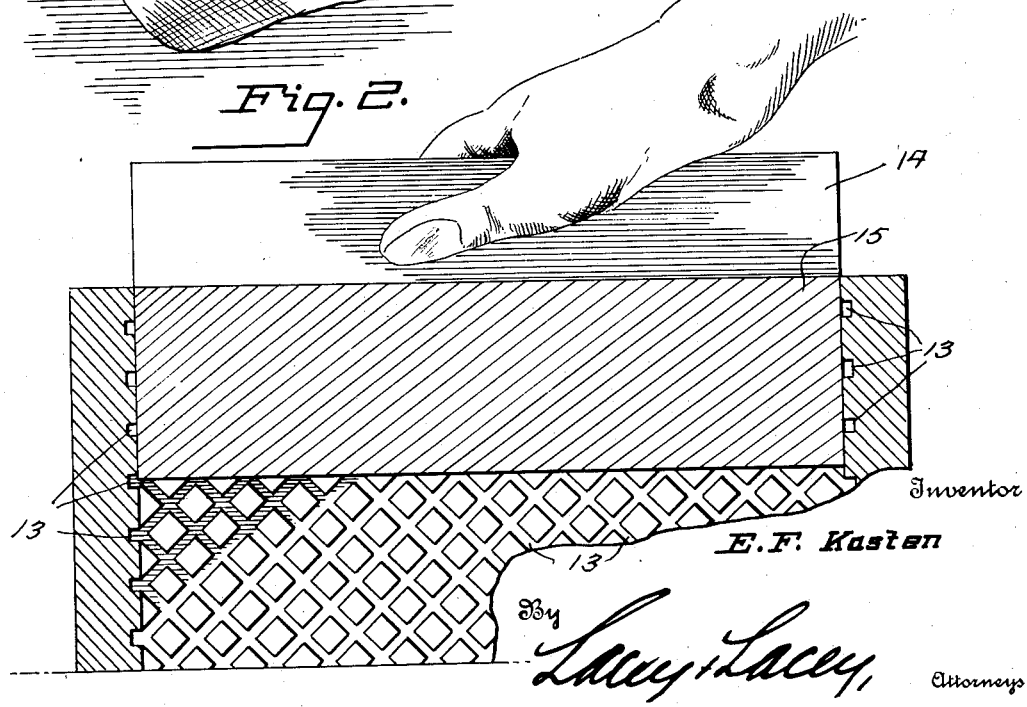
Inventor
E. F. Kasten
By Lacey & Lacey, Attorneys

UNITED STATES PATENT OFFICE 1,924,500

CHEESE MOLD

Ewald F. Kasten, Watertown, Wis.

Application January 20, 1932. Serial No. 587,773

2 Claims. (Cl. 31—45)

This invention relates to process and apparatus for cheese manufacture and has for an object to provide a novel mold which permits proper drainage of the whey and air from the rind while at the same time imparting to the rind a substantially continuous surface devoid of the usual unsightly holes.

A further object is to provide a cheese mold having diagonal creases or channels extending in both directions and intersecting so that the curd will have sufficient drainage to permit escape of all of the air and the whey that accumulates at the surface of the cheese.

A further object is to provide a cheese mold having intersecting diagonal creases on the inner surface, and a follower which is telescopically carried by the mold and which may be weighted to press the cheese downward in the mold so that the surface will constantly be wiped across unclogged or clean creases in the mold to accelerate drainage of the air and whey and compact the surface of the cheese so that a more perfect rind will be produced to lend attractiveness to the product.

With the above and other objects in view the invention consists in certain novel details of construction and combinations of parts hereinafter fully described and claimed it being understood that various modifications may be resorted to within the scope of the appended claims without departing from the spirit or sacrificing any of the advantages of the invention.

In the accompanying drawing forming part of this specification,

Figure 1 is a perspective view of the mold with the follower removed and showing the cheese occupying the lower half of the mold, Figure 2 is a longitudinal section of the mold inverted and the follower being shown in elevation in position to press the cheese downwardly.

Referring now to the drawing in which like characters of reference designate similar parts in the various views, 10 designates a mold which is preferably rectangular in outline and is open at the top and the bottom, the mold being adapted to be supported upon a burlap pad 9 or other suitable absorbent support to form a closure for the bottom of the mold. The side walls 11 and end walls 12 of the mold may be suitably joined together at the corners by any preferred method of jointing and preferably are formed of wood although any other desired material may be employed.

The inner faces of the sides and ends of the mold are provided with diagonal creases or channels 13 which extend in both directions and intersect as best shown in Figure 1. These channels are preferably formed rectangular in cross sections, although they may be of any desired cross section, it being simply necessary, to the practice of the method of cheese manufacture constituting this invention, to provide the walls of the mold with intersecting diagonal channels.

A follower 14, see Figure 2, is provided, and may be of the same or different material than the mold and is of sufficient dimensions to nicely telescopically enter into the mold. The follower preferably is of about one-half the height of the mold and may be weighted in any manner to enter the mold, such as for instance, by manually forcing the same into the mold to press the cheese 15 ahead of it, or by pressing a weight of any desired type on the follower when the mold is inverted to dispose the cheese at the top for the reversing step.

In carrying out the process the mold is filled about half way to the top with the cheese, as shown in Figure 1. The intersecting diagonal channels permit drainage of the air and whey from the curd. Next the mold is inverted to dispose the cheese at the top, as shown in Figure 2. Thereupon the follower 14 is placed on the cheese and may be pressed downward quickly or weighted to move downward slowly, in either case the cheese being advanced ahead of it to occupy a new channeled surface at the bottom of the mold so that the drainage of whey and escape of air may again be promoted.

It will be pointed out that during the reversal step just described the imprint of the diagonal channels first left on the surface or rind of the cheese is erased by the succeeding portions of the channels when the cheese is moved into register therewith, and this erasing operation is repeated again and again in accordance with the number of times the mold is reversed or the reversal operation performed, so that finally the cheese emerges with a substantially smooth rind devoid of holes, while at the same time the air and whey have been effectively drained and permitted to escape so that a more compact perfect rind and surface is produced than hitherto possible by the ordinary methods of cheese molding.

Having thus described the invention it is thought that the construction and operation thereof will be fully understood without further explanation.

What is claimed is:

1. Apparatus for the manufacture of cheese, comprising a mold of substantially greater height than the height of the product to be produced and provided on the mold faces with diagonal channels extending in two directions and intersecting, an absorbent pad forming a closure for the open bottom of the mold, and a follower of substantially like dimensions to the mold for telescopically entering the mold to press the product in advance of it longitudinally of the mold.

2. A reversible mold for cheese-making having an open top and open bottom and being of greater height than the product to be produced and having diagonal drainage channels throughout the entire inner faces of the mold, said channels intersecting, and a follower of substantially the same dimensions as the mold adapted to telescopically enter the mold at two reversed positions thereof and force the product to occupy a different portion of the inner channeled faces of the mold than it initially occupied, whereby the imprint of the channels initially imparted to the surface of the product will be erased by said different position of the channeled faces and a smooth rind will be produced on the product.

EWALD F. KASTEN. [L. S.]